United States Patent

Baker

[11] Patent Number: 5,946,152
[45] Date of Patent: Aug. 31, 1999

[54] METHOD OF REDUCING LIGHT BEAM JITTER OF AN INCOMING LIGHT BEAM

[75] Inventor: Jeffrey T. Baker, Bosque Farms, N.Mex.

[73] Assignee: The United States of America as represented by the Secretary of the Air Force, Washington, D.C.

[21] Appl. No.: 09/056,702

[22] Filed: Mar. 24, 1998

Related U.S. Application Data

[63] Continuation-in-part of application No. 08/657,493, Jun. 2, 1996, abandoned.

[51] Int. Cl.$^6$ .................................................. G02B 7/182

[52] U.S. Cl. ........................... 359/872; 359/555; 359/199

[58] Field of Search ...................................... 359/871, 872, 359/555, 199, 223, 224

[56] References Cited

U.S. PATENT DOCUMENTS

| | | | |
|---|---|---|---|
| 4,123,136 | 10/1978 | Dahab et al. | 359/555 |
| 4,613,203 | 9/1986 | Proetel et al. | 359/199 |
| 4,714,214 | 12/1987 | Schleimann-Jensen et al. | 224/3.16 |
| 5,245,464 | 9/1993 | Jensen | 359/224 |
| 5,276,545 | 1/1994 | Daun et al. | 359/198 |
| 5,754,327 | 5/1998 | Masotti et al. | 359/198 |

*Primary Examiner*—Cassandra Spyrou
*Assistant Examiner*—Mark A. Robinson
*Attorney, Agent, or Firm*—Robert L. Nathans

[57] ABSTRACT

Four loudspeaker voice coils are positioned in quadrature relationship, and a movable mirror support member is provided, having a mirror on a central hub portion, and having four outwardly extending orthogonal lightweight struts, each attached to an associated voice coil armature at a terminal strut portion. Jitter cancellation of a jittery incoming light beam directed at the mirror is effected by adjustment of tip/tilt AC generators coupled to the voice coils.

6 Claims, 1 Drawing Sheet

METHOD OF REDUCING LIGHT BEAM JITTER OF AN INCOMING LIGHT BEAM

CROSS REFERENCE TO RELATED APPLICATION

This application is a continuation-in-part of application Ser. No. 08/657,493, filed Jun. 2, 1996, now abandoned.

STATEMENT OF GOVERNMENT INTEREST

The invention described herein may be made by or for the Government for governmental purposes without the payment of any royalty thereon.

BACKGROUND OF THE INVENTION

In the course of developing a starlight tracking system at Rockwell International Inc., there was a need to provide apparatus for substantially eliminating oscillation or jitter of a light beam. Such jitter was in the neighborhood of 300 Hz. It was also beneficial to provide such an apparatus characterized by simplicity, and thus having low manufacturing cost.

BRIEF SUMMARY OF THE INVENTION

In accordance with a preferred method of the invention, a light beam deflector is provided having four loudspeaker voice coils positioned in a quadrature relationship and having a movable mirror support member including four radially extending lightweight rigid elongated members, each having a terminal peripheral portion affixed to an associated voice coil. A beam having jitter to be corrected is reflected off of a mirror affixed to a centralized portion of the mirror support member and AC generator circuitry coupled to the voice coils is adjusted manually or otherwise in a push-pull mode in order to substantially eliminate the input beam jitters.

BRIEF DESCRIPTION OF THE DRAWINGS

Various features of the invention will become more apparent to the skilled worker in the art upon reading the following description, taken in conjunction with the drawings in which.

DETAILED DESCRIPTION OF THE INVENTION

Figure 1:
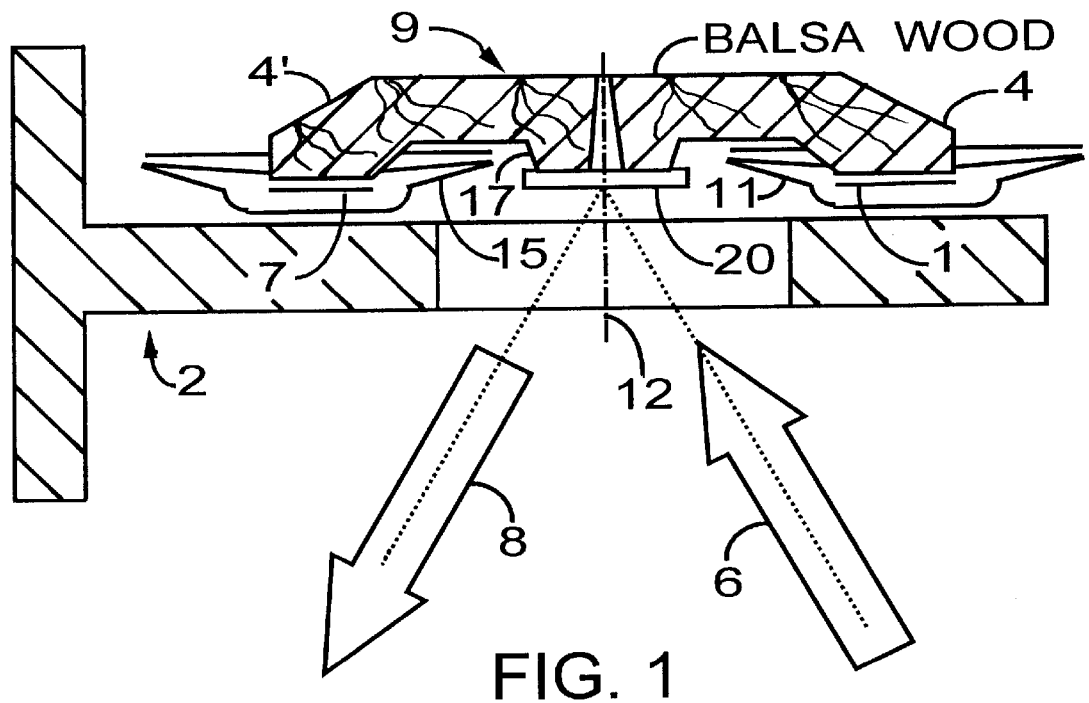
FIGS. 1 and 2 schematically illustrate a side sectional view and partial front view respectively, of a preferred light beam deflector employed in the practice of the invention.
Figure 2:
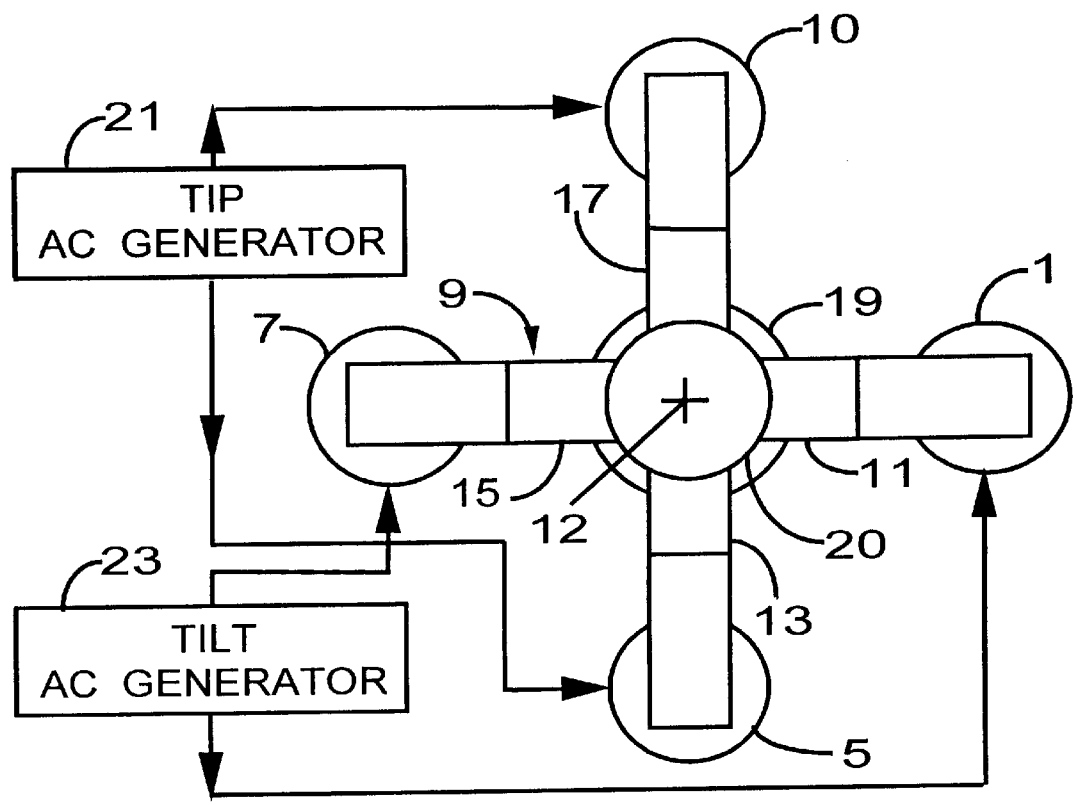

As shown in FIGS. 1 and 2, four electrical to mechanical vibration generators or transducers are supported by transducer support means 2 in a quadrature relationship, whereby the transducers 1, 5, 7, and 10 are positioned at 0, 90, 180, and 270 degrees with respect to optical axis 12 and are thus at right angles with respect to each other. Movable mirror support means 9 has a central portion 19 bearing mirror 20 centered with respect to axis 12 for correcting beam jitter in a manner to be described. Four lightweight rigid struts or elongated members 11, 13, 15, and 17 extend radially from the central portion of hub 19 of the mirror support member, and have peripheral terminal portions affixed to the transducers, which preferably are movable loudspeaker voice coils. For a further description of a suitable conventional voice coil/loudspeaker arrangement, see Van Nostrand's Scientific Encyclopedia, Sixth Edition, page 1786. The use of such conventional loudspeaker coils for the vibration generating mechanical to electrical transducers, greatly decreases the manufacturing cost of the apparatus. The floating mirror support means 9 can beneficially be made of balsa wood which is very lightweight, enabling rapid response to the electrical input signals to the voice coils to be described.

AC tip control generator 21 is connected to loudspeaker voice coils 5 and 10 to cause the coils to vibrate 180 degrees out of phase with each other. Similarly, AC tilt control generator 23 is connected to loudspeaker voice coils 1 and 7 to cause these coils to also vibrate 180 degrees out of phase with respect to each other. Light beam 6 having the jitter to be eliminated, is reflected off of mirror 20 and the reflected beam 8 will have the jitter substantially reduced if the AC generators are adjusted to have frequencies that correspond to the light beam jitter frequencies in both the tip and tilt directional modes. In other words, the frequency of the tip control AC tilt generator 21 is adjusted, manually or otherwise, until the tip mode jitter beam component is at least partially canceled, and the frequency of the AC generator 23 is adjusted in like manner to at least partially cancel the tilt mode beam jitter component. The amplitudes of the signals of the AC generators can also be individually adjusted to maximize cancellation of the degree of beam jitter in both tip and tilt component modes. The pairs of signals produced by each AC generator will be 180 degrees out of phase, and thus assume a push-pull relationship, so that When transducer 1 is pulling upper terminal portion 4 of the mirror support to the right in FIG. 1, the lower transducer 7 will be pushing terminal portion 4' to the left, to tilt the mirror to displace the reflected beam downward and the reverse during the next half cycle of the AC signal, thereby to oscillate the mirror at a frequency and amplitude under the control of AC tilt generator 23. Vibration in the tip mode, orthogonal to the tilt mode is similarly produced by AC push-pull circuit 21. It should now be appreciated that the method of the invention eliminates the aforesaid jitter by producing compensatory mirror displacements which correspond to the frequency and amplitude of the jitter of the incoming beam.

The apparatus described was built and successfully operated. The voice coils had a diameter of two inches and displaced the aforesaid balsa wood struts. Low voltage 300 Hz inputs to the voice coils caused 1.7 milliradian per volt of reflected angular light beam displacement. The range was plus or minus 15 milliradians.

Since variations in the described embodiment of the invention will become apparent to the skilled worker in the art, the scope of the invention is to be limited only to the terms of the following claims and art recognized equivalents thereof.

What is claimed is:

1. Method of substantially eliminating oscillations of a jittery incoming light beam comprising the steps of:
   (a) providing a light beam deflector having
      (a-1) a first and second pair of electrical to mechanical vibration transducers arranged in a quadrature relationship;
      (a-2) a lightweight rigid movable mirror support means for supporting a mirror upon a central portion thereof and having four peripheral portions, each affixed to an associated vibration transducer;
   (b) causing the mirror of said light beam deflector to intercept said jittery incoming light beam to produce a deflected beam therefrom; and
   (c) adjusting the frequencies and amplitudes of first and second push-pull alternating electrical signals applied to said first and second pair of vibration transducers respectively in accordance with a frequency of oscillation of said incoming light beam; until the oscillations of said incoming light beam are substantially eliminated from said deflected beam.

2. The method of claim 1 wherein the step of adjusting the frequencies and amplitudes is performed manually.

3. Method of substantially eliminating oscillations of a jittery incoming light beam comprising the steps of:
   (a) providing a light beam deflector having
      (a-1) a first and second pair of electrical to mechanical vibration transducers arranged in a quadrature relationship;
      (a-2) movable mirror support means for supporting a mirror upon a central portion thereof and having four peripheral portions, each peripheral portion affixed to an associated vibration transducer;
   (b) causing the mirror of said light beam deflector to intercept said jittery incoming light beam to produce a deflected beam therefrom; and
   (c) adjusting the frequencies and amplitudes of first and second push-pull alternating electrical signals applied to said first and second pair of vibration transducers respectively, in accordance with a frequency of oscillation of said incoming light beam; until the oscillations of said jittery incoming light beam are substantially eliminated from said deflected beam.

4. The method of claim 3 wherein the step of adjusting the frequencies and amplitudes is performed manually.

5. Method of substantially eliminating oscillations of a jittery incoming light beam comprising the steps of:
   (a) providing a light beam deflector having
      (a-1) a first and second pair of electrical to mechanical vibration transducers arranged in a quadrature relationship;
      (a-2) movable mirror support means for supporting a mirror upon a central portion thereof and having four peripheral portions affixed to an associated vibration transducer and connected to said central portion via four mutually perpendicular lightweight rigid coupling members;
   (b) causing the mirror of said light beam deflector to intercept said jittery incoming light beam to produce a deflected beam therefrom; and
   (c) individually adjusting the frequencies and amplitudes of first and second push-pull alternating electrical signals applied to said first and second pair of vibration transducers respectively, in accordance with a frequency of oscillation of said incoming light beam until the oscillations of said jittery incoming light beam are substantially eliminated from said deflected beam.

6. The method of claim 5 wherein the step of adjusting the frequencies and amplitudes is performed manually.

* * * * *